Oct. 29, 1957 E. J. DIEBOLD 2,811,687
MULTIPLE-TWO PHASE SINGLE-WAY MECHANICAL RECTIFIER
Filed June 15, 1953 3 Sheets-Sheet 1
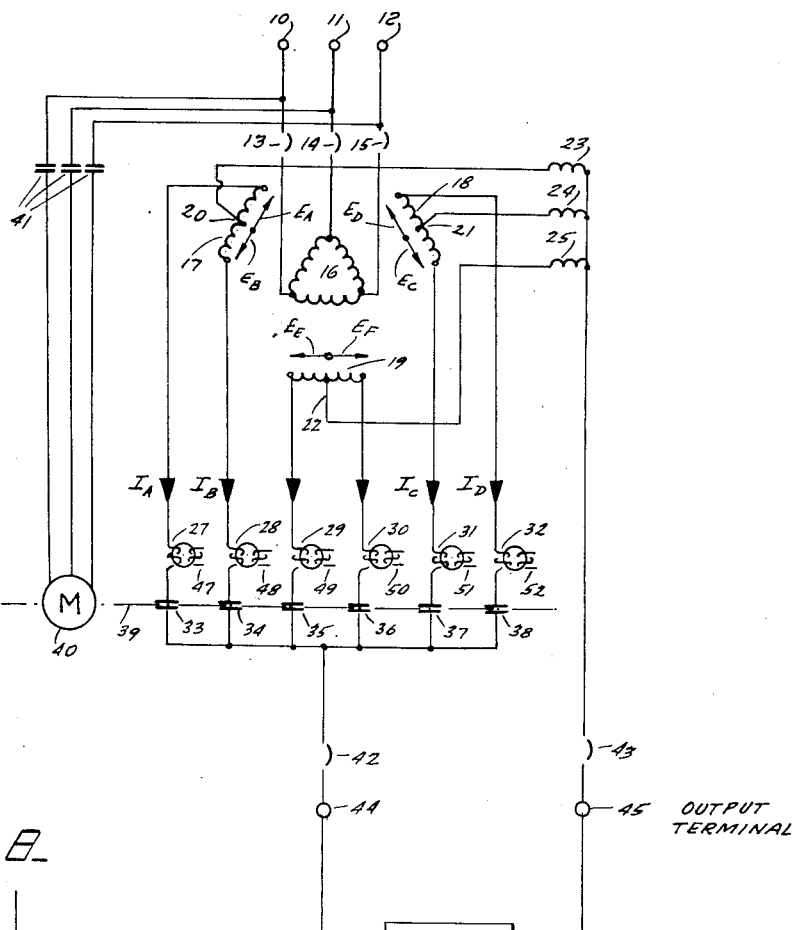
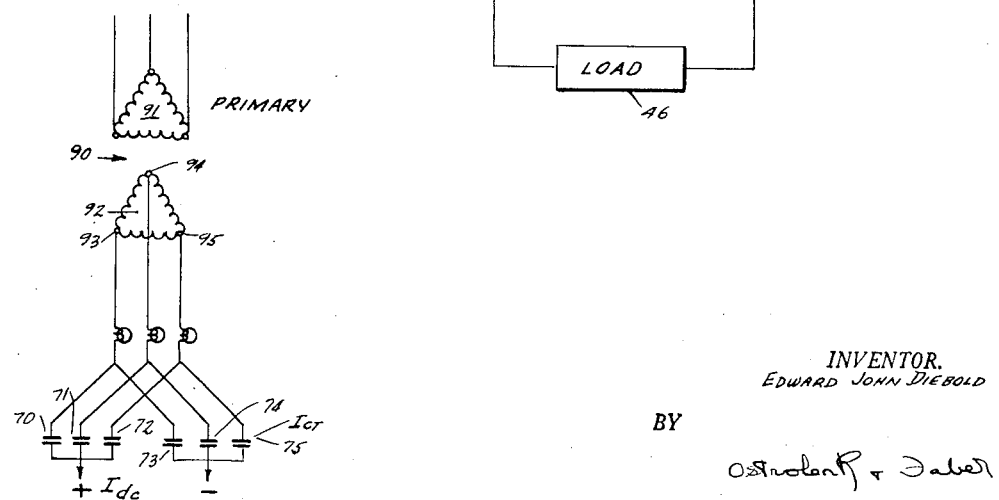
INVENTOR.
EDWARD JOHN DIEBOLD
BY
ATTORNEYS Oct. 29, 1957      E. J. DIEBOLD      2,811,687
MULTIPLE-TWO PHASE SINGLE-WAY MECHANICAL RECTIFIER
Filed June 15, 1953      3 Sheets-Sheet 2
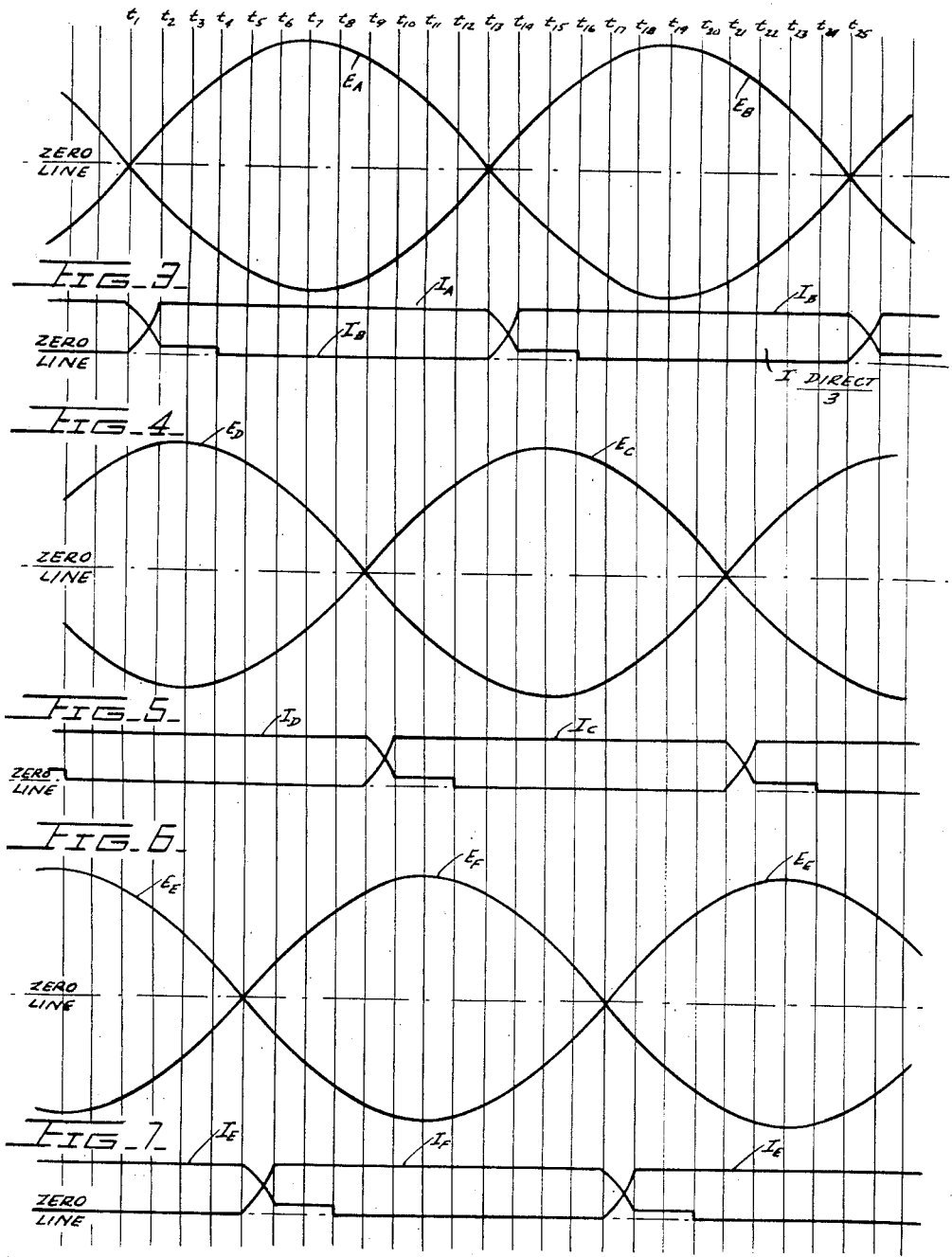
INVENTOR.
EDWARD JOHN DIEBOLD
BY
ATTORNEYS Oct. 29, 1957     E. J. DIEBOLD     2,811,687
MULTIPLE-TWO PHASE SINGLE-WAY MECHANICAL RECTIFIER
Filed June 15, 1953     3 Sheets-Sheet 3
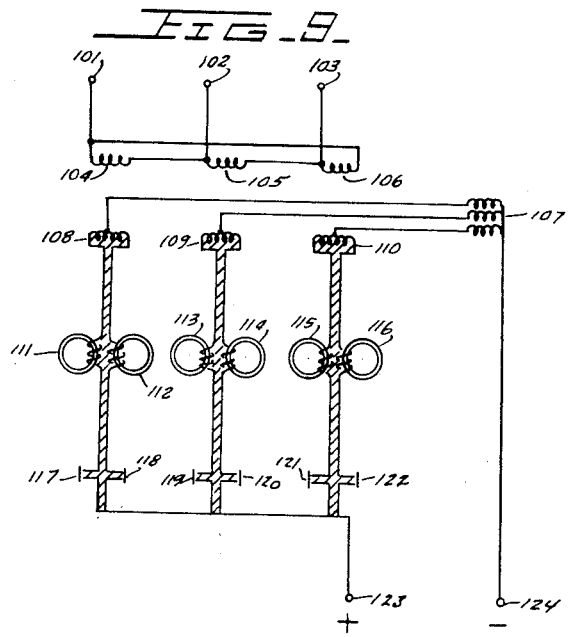
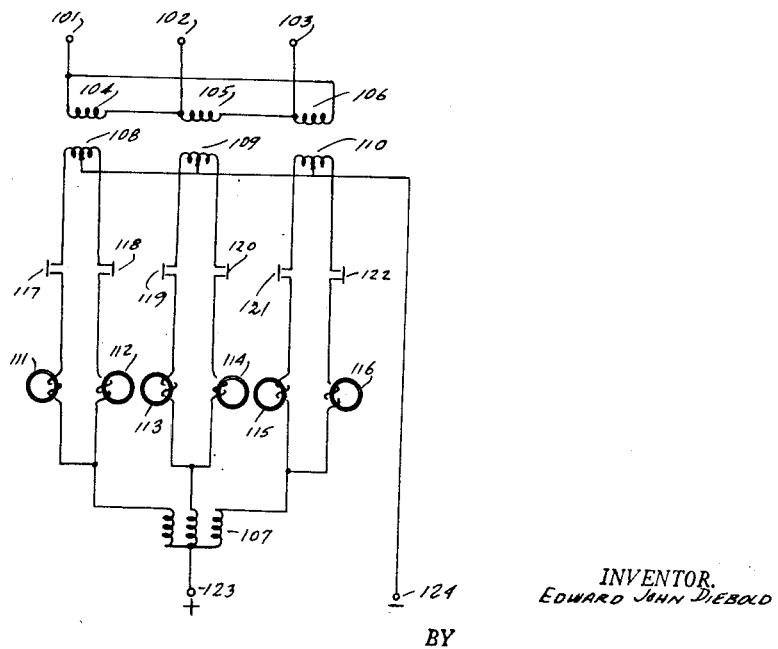
INVENTOR.
EDWARD JOHN DIEBOLD
BY
ATTORNEYS

United States Patent Office 2,811,687
Patented Oct. 29, 1957

2,811,687

MULTIPLE-TWO PHASE SINGLE-WAY MECHANICAL RECTIFIER

Edward John Diebold, Ardmore, Pa., assignor to I-T-E Circuit Breaker Company, Philadelphia, Pa.

Application June 15, 1953, Serial No. 361,670

1 Claim. (Cl. 321—48)

My invention relates to a novel mechanical rectifier and is more particularly directed to a low voltage high current mechanical rectifier circuit providing six or twelve phase rectification by a multiple two phase one way rectifier.

It is desirable to make rectifiers for low voltages (from 20 to 200 volts) and very high currents (above 20,000 amperes) for electrolytic application. Many new processes require large currents at low voltages, such as modern electrochemistry. Modern electrolytic cells are more complicated and require more accessories; but they can be built for larger currents. Putting the cells in series permits increasing the voltage, but also increases the number and cost of the auxiliaries and reduces the flexibility of operation; it is desirable to use fewer, larger cells requiring less voltage and more current.

Present day mechanical rectifiers can be made and are made for low voltages but they are not competitive in cost. My invention is a mechanical rectifier giving a higher current output and uses a mechanical design and an electrical circuit which are economical and efficient.

One distinguishing feature of the new rectifier is that it is a single-way rectifier against the double-way rectifiers known in the prior art. A double-way rectifier consists of two rectifying systems connected back to back, one operating in the positive direction and one operating in the negative direction, which has the advantage of using the transformer in two ways. Single-way rectifiers consist of only one rectifying system operating in only one direction with the known disadvantage that the transformer also operates in only one direction.

The difference between double-way and single-way rectifiers is a double current and half voltage available in a single-way rectifier when using the same A.-C. supply system.

From the standpoint of high currents, another disadvantage of the prior art was that only one contact at a time was carrying current in the desired direction meaning that the whole load current had to be supplied by that one contact. The new system has the advantage that three contacts at a time are carrying the current and that any one contact never carries more than ⅓ of the output current.

Considering the different magnitudes of effective value of current, the new rectifier has the ability of carrying two and one-half times more current with the same contacts and the same number of them as the previously known mechanical rectifier.

The transformer consists of a primary winding which can be in any known three phase connection. The secondary consists of three single-phase windings situated on three independent legs of the transformer, each winding operating as a two phase rectifier.

A two-phase rectifier is commonly called "single phase center tap" although the transformer has two phase windings displaced by 180° situated on a single phase transformer core. Single phase means one rectified pulse per cycle, two phase; two pulses per cycle, three phase; three pulses per cycle, etc.

The ends of each winding are connected to a commutating reactor and contact in series. All contacts are connected in parallel and form the positive output terminal of the rectifier. The three center taps are connected in parallel and form the negative output terminal of the rectifier. The three center taps are connected to an interphase transformer, the neutral of which is the negative terminal of the rectifier.

Another advantage of the circuit is the low inductance of the conductors leading from the transformer to the commutating reactors and the contacts to the output. Up to now, the inductance of the bus bars was one of the major obstacles which could not be overcome with the previously known mechanical rectifiers. Its detrimental effect caused an excessive voltage drop in the rectifier, increased the overlap to an intolerable length and reduced the power factor. Using the same current carrying bus bars of the same length and operating them at the same current, their apparent inductance in the new system will be approximately 3.7 times smaller than in the previously made rectifiers or inversely the limit at which a rectifier can be operated at low voltage due to bus bar inductance will now be 3.7 times lower.

By providing independent secondary windings in the supply transformer and connecting the cooperating contacts to the outer terminals thereof, I am able to provide three independent circuits which have two-phase, single-way rectification. That is, although the rectifier may be supplied from a three phase source, my novel arrangement permits two-phase rectification for each of the three phases of the source. Thus, the cooperating contacts associated with the circuitry of each phase will be in contact closed position for 180° of the conducting cycle.

In contradistinction, the prior art mechanical rectifiers having three phase double-way rectification providing only 120° conduction through the cooperating contacts. Thus, with my novel two-phase one-way circuit arrangement for a three phase source, the magnitude of the load current can be substantially increased due to the increased period of time, namely 180° that the contacts conduct current.

A further advantage of my invention is the cost and size of a complete rectifier installation built with the circuit. For example, for 30 volts the cost will only be 68% of the same rectifier built with the previously used rectifier circuit.

The difference in cost is due to the fact that from 12,500 to 20,000 ampere current can be obtained with one six contact circuit as described in this invention. One rectifier with twelve contacts, as described in this invention, necessitating only one drive system can deliver from 25,000 to 40,000 amperes whereas the previously known mechanical rectifier produces only 5,000 amperes with six contacts and 10,000 amperes with twelve contacts. For the same output therefore, only one third or one quarter of the number of units will be required with the new circuit.

Another advantage of my invention is the absence of the so-called 60° condition which limits the maximum current which can be carried with the previously used rectifier. Taking advantage of the unlimited current carrying capacity of the rectifier, contacts have been built that can carry currents of more than 4,600 amperes effective, which brings the possible maximum current obtainable to 20,000 amperes with six contacts and 40,000 amperes with twelve contacts, as mentioned above.

The cost of a mechanical rectifier installation is largely determined by such items as the synchronous motor, its motor starter and D.-C. supply system for the field, the housing for the mechanical linkage, the lubricating system and cooling of the mechanical rectifier. Other items of fixed cost are the protective system, like short circuiters and their auxiliaries, and also the regulators. The total cost of all this fixed equipment must be paid for, no matter if one unit of a mechanical rectifier is built for 10,000 amperes as it was possible in the prior art or if the same equipment can be built for 40,000 amperes. Obviously, the average price per ampere output can be much lower for large current rectifier installations.

Accordingly, a primary object of my invention is to provide a novel mechanical rectifier in which the plurality of cooperating contacts are all connected to one terminal of the load to provide single-way rectification.

Another object of my invention is to provide a circuit arrangement for mechanical rectifiers in which the terminal load current through each of the cooperating contacts is a fractional portion of the total load current.

A further object of my invention is to provide a mechanical rectifying unit for low voltage high current application which has a minimum magnitude of bus bar inductance.

Another object of my invention is to provide a novel arrangement for parallel connected mechanically operated contacts in a rectifier circuit in which a plurality of the contacts simultaneously carry a portion of the total load current.

Another object of my invention is to provide a novel mechanical rectifier which is adaptable for three phase application in which three independent circuits are provided, each having two-phase single-way rectification.

Another object of my invention is to provide novel circuits for a mechanical rectifier in which the cooperating contacts are closed for a period of 180° to thereby substantially increase the magnitude of load current available from a predetermined contact design.

Another object of my invention is to provide a rectifier which may have either six or twelve contacts with a common transformer for all.

These and other objects of my invention will become apparent from the following description when taken in connection with the drawings in which:

Figure 1 is a wiring diagram illustrating the circuitry of my novel mechanical rectifier.

Figure 2 is a voltage-time curve of the voltage appearing across each half of one independent secondary winding of the supply transformer used in my invention.

Figure 3 is a current-time curve illustrating the current flow through the cooperating contacts associated with each half of a first independent secondary. The current curves illustrated in Figure 3 are those associated with the first windings which has its voltage representation indicated in Figure 2.

Figures 4 and 5 are similar to Figures 2 and 3 but show the voltage and current representation, respectively, of a second independent secondary winding of the supply transformer.

Figures 6 and 7 are similar to Figures 2 and 3 and illustrate the voltage and current representation, respectively, of a third independent secondary winding of my invention.

Figure 8 is a schematic wiring diagram representation of the prior art mechanical rectifiers. This figure illustrates the three phase rectification which is replaced by single phase rectification in my novel circuit, the two-way rectification through the cooperating contacts which is replaced by the one-way rectifier of my invention and illustrates the necessity for having the continuous current rating of any one contact equal to the load current whereas the continuous current rating of the contact of my invention need only be a fraction of the magnitude of the load current.

Figure 9 is a schematic wiring diagram of the same circuit as in Figure 1.

Figure 10 is a schematic wiring diagram of another shape of the same circuit as in Figures 1 and 9.

Referring now to Figure 1, the numerals indicating the following components: 10, 11 and 12 are the input terminals of the rectifier; 13, 14 and 15 are the three poles of a circuit breaker; 16 is the delta connected primary winding of the main power transformer of the rectifier; 17, 18 and 19, respectively, are the first, second and third independent secondary windings. Each of the secondary windings is wound on one leg of the three phase transformer, the windings, therefore, being single phase windings. 20, 21 and 22 are the center taps of these single phase windings 16, 17 and 18; 23, 24 and 25 are the three windings of a three phase interphase transformer 26; 27, 28, 29, 30, 31 and 32 are commutating reactors connected in series with each of the winding terminals of the transformer.

The commutating reactors 27 through 32 may be constructed as shown in copending application Ser. No. 301,880 filed July 31, 1952, now Patent No. 2,759,128, issued August 14, 1956. 33, 34, 35, 36, 37 and 38 are the contacts of the mechanical rectifier. They are actuated by a mechanical linkage (shown as a dot dash line 39) which in turn is driven by a synchronous motor 40. The synchronous motor 40 is connected to the input terminals 10, 11 and 12 of their contactor 41. The synchronous motor and linkage indicated by the dot dash line 30 connected by the cooperating contacts 33 through 37 is illustrated in copending applications Ser. No. 307,024 filed August 29, 1952, and Ser. No. 307,067 filed August 29, 1952. The contactor 41 may be of the type set forth in copending application Ser. No. 358,157, filed May 28, 1953, and forms no part of my present invention.

A D.-C. circuit breaker having the poles 42 and 43 connects the rectifier to the output terminals 44 and 45 to which a load 46 can be attached. 47 through 52 are pre-excitation windings on the commutating reactors providing a pre-excitation current during the low current step period permitting the contacts to open with low current. The commutating reactor and pre-excitation windings are fully described in my copending applications Ser. No. 212,017 filed February 21, 1951, and Ser. No. 257,901 filed November 23, 1951.

The operation of the rectifier is as follows: When the voltage $E_A$ of the transformer secondary 17 is positive as shown on the left hand side of Figure 2, a current flows from the neutral point 20, through the upper half of winding 17, the commutating reactor 27, the contact 33, to the load 46 and back through the interphase transformer winding 23 to the center tap 20. The current flowing through this path is shown as $I_A$ in Figure 3. It starts to rise at the time $t_1$ at which time the contact 33 is closed by the synchronous motor 40 through linkage 39. At the time $t_{13}$, the contact 34 closes and the winding 17 is short-circuited through the commutating reactors 27 and 28 and the contacts 33 and 34. The voltage $E_B$ at that time increases into the positive direction and the voltage $E_A$ decreases into the negative direction. The current in this closed circuit therefore increases in contact 34 and decreases in contact 33 until the current $I_B$ flowing through contact 34 has increased to the full value and the current $I_A$ has decreased to almost 0, which is at the time $t_{14}$. For the time $t_{14}$ and $t_{16}$, the current through contact 33 is held at a very low value by the commutating reactor 27, shown as a current-step in Figure 3. During this time, for example at $t_{15}$, the contact 33 opens without damage to its surface, and the contact 34 now is the only one closed for this particular transformer winding. At the time $t_{25}$, which is equivalent to the time $t_1$ in Figure 3, the contact 33 closes again, whereupon the current $I_A$ increases again and the current $I_B$ decreases to 0.

The rectification consists therefore of an alternate current carried by only two contacts, one of which is always closed and the other closing-in next to take over the current.

Figure 4 shows the voltages $E_C$ and $E_D$ appearing on the transformer winding 18 which is rectified by the contacts 37 and 38. The currents through these contacts are shown as $I_C$ and $I_D$ in Figure 5. As the Figures 3 and 5 are plotted at the same time scale, it can be seen that the commutation between the current $I_C$ and $I_D$ is delayed by 120° upon the commutation of the currents $I_A$ and $I_B$. The contact 37 closes at the time $t_9$. The current $I_C$ increases from this time until $t_{10}$ when the current $I_D$ has reached zero value. A step then occurs in the commutating reactor 32, maintaining $I_D$ at zero value and permitting the opening of contact 38 at the time $t_{11}$.

One half cycle later, that is at the time $t_{21}$, the contact 38 closes again, causing the current $I_D$ to increase rapidly, until the time $t_{22}$ at which time the current $I_C$ has reached zero and the contact 37 being opened at the time $t_{23}$.

The operation of the contacts 35 and 36 is exactly the same as described above except that it occurs again 120° later than the previously described commutation, thus giving a balanced six phase wave shaped direct current output accomplished by means of a single phase full wave rectification repeated three times in parallel and three independent phases.

The interphase transformer 26 supplies the necessary voltage difference between the three independent voltages which are closed at the same time upon the common positive bus connected to the breaker 42.

At the time $t_4$, for example, the voltage $E_A$ is positive and the contact 33 is closed. The voltage $E_D$ is also positive but of a higher value and the contact 38 also closed. The voltage $E_E$ is also positive but of a very small value and the contact 35 is also closed upon the same positive terminal. The other contacts 34, 36 and 37 are open and negative voltages appear on the open contacts.

The difference between the three voltages $E_A$, $E_D$ and $E_E$ appear on the interphase transformer windings 23, 24 and 25. These voltage differences are alternate voltages and appear on the windings 23, 24, 25 of the interphase transformer (also called interphase reactor). The interphase transformer 26 is wound in such a way that these difference voltages appear across its winding, whereas the D.-C. current through them oppose each other. Thus, the output voltage between numerals 44—45 is the average of these three two phase D.-C. voltages, i. e., a six phase ripple.

The interphase transformer operation for such a rectifier is shown in Mercury Arc Power Rectifiers, Othmar K. Marti and Harold Winograd, McGraw-Hill Book Co., 1930, chapter VI, page 127.

As seen in Figure 8, which illustrates the prior art mechanical rectifier arrangement, the transformer 90 consists of delta connected primary windings 91 and delta connected secondary windings 92. The contacts 70, 71 and 72 are connected to the positive terminal of the load and the terminals 73, 74 and 75 are connected to the negative terminal of the load. In this arrangement, whereby the forward and reverse contacts such as 70—73, 71—74 and 72—75 are, respectively, connected to terminals 92, 94 and 95 of the three phase secondary windings 92, only one contact will carry current in a forward direction to the load at any one time. Thus, for example, the forward current contact 70 will be closed while the forward current contacts 71 and 72 are open, thereby necessitating this contact 70 to carry the full load current. Furthermore, since this arrangement provides a three phase full wave rectifying circuit, each contact will be closed for a period of 120°.

As above noted, each of the contacts 33, 34, 35, 36, 37 and 38 of my invention are forward contact carrying connections and will only be required to carry a portion of the full load current. Thus, for example, at time $t_4$ a contact 33, 35 and 38 will be closed thereby necessitating each contact to carry only one third of the load current.

As for the prior art, the application of pre-excitation and straightener circuits is needed with the commutating reactor, voltage control is possible by partial flow reversal of the commutating reactors, and also by phase delay of the contact make. This circuit offers no new problems for any of these classical control schemes. Protection by short-circuiters (by-passes) and circuit breakers is also needed.

Figure 9 shows a schematic of the same circuit as shown in Figure 1. As this is only a schematic circuit, the circuit breakers 13, 14, 15, 42 and 43 have been omitted, the same as the contactor 41, the synchronous motor 40, the linkage 39 and the control windings 47 through 52. These components are always necessary, but they were not shown in Figure 9.

101, 102 and 103 are the three A.-C. terminals. 104, 105, 106 are the primary windings of the transformer which is connected in delta. 108, 109, 110 are the secondary windings of the transformer. 107 is the three-phase interphase transformer. 111, 112, 113, 114, 115, 116 are the six commutating reactors. The contacts of the mechanical rectifier are 117, 118, 119, 120, 121, 122, 123 and 124 are the D.-C. terminals of the mechanical rectifier.

The other representation of the same circuit in Figure 9 against Figure 1 shows more clearly the three independent commutating circuits as described for Figure 1.

It is essential, for any low voltage high current mechanical rectifier, to have a low commutating reactance. If this is the case, then the reactive voltage drop of the mechanical rectifier will be small, the power factor will be high, the overlap, and particularly the variation of overlap with varying load, will also be small. This means that the size of commutating reactors can be held small, because the overlap changes only little and a short step length is sufficient.

In three-phase and six-phase mechanical rectifiers, the commutation occurs between several phases which are in practice represented by heavy bus bars. It is, of course, impossible to place more than two bus bars close to each other, i. e., the outlying bus bars always have a much larger inductance between them than the nearest bus bars. Figure 9 shows clearly the advantage of this circuit, since only two conductors are emerging from transformer winding 108 to go to the commutating reactors 111 and 112, to the contacts 117 and 118 and the positive terminal of the rectifier. These two bus bars can be spaced close to each other and thus the commutating circuit has a very low inductance.

Since commutation only happens between the two sides of transformer winding 108, or the two sides of the transformer winding 109, or the two sides of transformer winding 110, but never from one winding to another, only the bus bars emerging from one winding have to be spaced close to each other. The bus bars from two different windings can be spaced as desired.

The mechanical rectifier, therefore, can be designed with three bundles of two bus bars each. These three bundles can be spaced as far apart as seems necessary. This freedom of design is very valuable, because in many instances, for reasons of cooling, bracing or mechanical build-up, the bus bars must be spaced wider apart than the minimum theoretical possible and then unbalance, or unduly high inductance, will impair the operation.

Since the contacts used in the mechanical rectifier usually are bridge contacts, rather than direct contacts as shown in Figure 1, the contacts shown in Figure 9 are of the bridge type. These bridge contacts are illustrated in copending applications Serial No. 307,024, filed August 29, 1952, and Serial No. 307,067, filed August 29, 1952, assigned to the assignee of the instant application.

Figure 10 shows the same circuit as Figure 1 and Figure 9 but in a different arrangement. The numbers for the component parts are the same as in Figure 9.

Whereas the interphase transformer 107 was connected in the negative lead in Figure 1 and Figure 9, it has been connected in the positive lead in Figure 10. The operation of the circuit is exactly the same, and the position of interphase transformer can be chosen freely.

Similarly, the contacts 117 through 122, and the commutating reactors 111 through 116, do not have to be arranged as in Figure 1 and Figure 9. They can also be interchanged, as in Figure 10. The operation of this circuit is exactly the same as in the two previously shown circuits, and the different arrangement is only shown as one of the many examples, to obtain the same rectifier by a different arrangement. Such different arrangements have practical value, if they permit a more favorable mechanical arrangement of the parts. It is always important, with the low-voltage high current circuits, to keep the bus bars as short as possible, and therefore such a different arrangement might permit a better mechanical set up, while keeping the bus bars short.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claim.

I claim:

In a high current low voltage rectifier for supplying a direct current to a load from an alternating current source; a first, second, third, fourth, fifth and sixth mechanically operated contact respectively associated with and connected in series with a first, second, third, fourth, fifth and sixth commutating reactor; said first contact and said first commutating reactor connected to one terminal of a first independent secondary winding; said second commutating reactor and contact connected to another terminal of said first secondary winding; said third commutating reactor and contact connected to a first terminal of a second secondary winding; said fourth commutating reactor and contact connected to another terminal of said second secondary winding; said fifth commutating reactor and contact connected to a first terminal of a third secondary winding; said sixth commutating reactor and contact connected to another terminal of said third secondary winding; said contacts associated with said first, second and third secondary windings respectively being operated substantially 180° out of phase with one another; one contact associated with each of said first, second and third transformer windings simultaneously in the closed position; each of said last mentioned contacts carrying one third of the load current.

References Cited in the file of this patent

UNITED STATES PATENTS

| | | |
|---|---|---|
| 1,434,346 | Jonas | Oct. 31, 1922 |
| 1,957,229 | Sabbah | May 1, 1934 |
| 2,141,921 | Leukert | Dec. 27, 1938 |
| 2,261,685 | Jordan | Nov. 4, 1941 |
| 2,310,792 | Koppelmann | Feb. 9, 1943 |
| 2,568,140 | Belamin | Sept. 18, 1951 |
| 2,602,152 | Storsand | July 1, 1952 |

FOREIGN PATENTS

| | | |
|---|---|---|
| 612,130 | France | Oct. 18, 1926 |
| 612,131 | France | Oct. 18, 1926 |